United States Patent Office 3,436,251
Patented Apr. 1, 1969

3,436,251
PROCESS FOR RENDERING PAPER ABRASION RESISTANT, ADHESIVE AND WATER-REPELLENT EMPLOYING SILOXANE COMPOSITION
David M. Rees, Whitchurch, Cardiff, Glamorgan, Wales, assignor to Midland Silicones Limited, Reading, Berkshire, England
No Drawing. Filed July 29, 1965, Ser. No. 475,874
Int. Cl. D21h *1/40;* B32b *29/06*
U.S. Cl. 117—155
29 Claims

ABSTRACT OF THE DISCLOSURE

Paper is rendered adhesive, water-repellent and abrasion resistant by coating the paper with a mixture of alkylhydrogensiloxane polymer, hydroxy- or alkoxy-endblocked diorganosiloxane polymer and aminoalkoxysilane and curing the mixture.

---

This invention relates to a process for producing improved siloxane-coated paper and paper products and to coated paper and paper products obtained thereby.

It is now well-known that siloxane polymers can be applied to cellulosic and other materials to produce a coating on the materials which is both water repellent and non-adherent to sticky substances. This particular property of non-adherence has rendered the treated paper suitable for a wide variety of applications including its use as interleaving for adhesive tapes and in the packaging of sticky materials such as bitumen and confectionery.

Among the siloxane polymers which have found wide application in the treatment of paper are the methylhydrogen polysiloxanes. More recently the properties of the finished coating have been improved by the use of methylhydrogen polysiloxanes in combination with other organopolysiloxanes, particularly the dimethylpolysiloxanes, the compositions being applied either from a solvent solution or an aqueous emulsion. These improved compositions have proved largely successful and good release properties are imparted to the treated surface using both the solvent and emulsion techniques. However, it has been found that when the siloxane compositions are applied from an organic solvent solution the siloxane coating suffers from relatively poor abrasion resistance, that is, it can easily be removed from the paper surface by rubbing with the finger or with a damp cloth.

The primary object of this invention is to introduce a means of improving the abrasion resistance of siloxane paper coatings obtained by the application of compositions containing alkylhydrogen polysiloxanes, particularly when the polysiloxanes are applied to the paper from an organic solvent solution. The production of a water-repellent, adhesive paper of good wet strength and abrasion resistance is also an object of this invention. Other objects and advantages of this invention are detailed in or will be apparent from this disclosure.

This invention, in its broad concept, is based on the discovery that when compositions containing alkylhydrogen polysiloxanes are applied to paper or paper products the abrasion resistance of the siloxane coating can be significantly improved if there are included in the treating composition certain amino-substituted organosilicon compounds.

Accordingly this invention provides a process for the treatment of paper and paper products which comprises applying thereto a comosition comprising (1) a mixture of (a) an alkylhydrogen polysiloxane with (b) a diorganopolysiloxane containing terminal, silicon-bonded hydroxyl or alkoxy radicals, and (2)(c) an amino-substituted silane containing at least one silicon-bonded alkoxy radical and at least one amino group bonded to the silicon through one or more than two carbon atoms, or a benzene soluble hydrolyzate of the silane, and thereafter curing the applied siloxane.

The siloxane component of the paper treating composition comprises a mixture of (a) an alkylhydrogen polysiloxane and (b) alpha, omega OH or alkoxy endblocked diorganopolysiloxane. The alkylhydrogen polysiloxanes employed herein are in the process of this invention substantially linear siloxane polymers or copolymers in which some of the silicon atoms have hydrogen atoms bonded thereto, the remaining valencies of the silicon atoms being satisfied with alkyl radicals or with the oxygen atoms forming [—SiOSi—] linkages within the siloxane chain. Preferred as the alkylhydrogen polysiloxanes are those of the unit general formula R''' HSiO, wherein R''' is an alkyl radical such as methyl, ethyl, propyl, nonyl and octadecyl, or copolymers of those units with diorganosiloxane units, for example dimethylsiloxane units. If desired, the alkylhydrogen siloxane polymers and copolymers can be end-stopped with any suitable organosilyl units, for example trimethylsilyl units or dimethylhydrogensilyl units. Particularly preferred as the alkylhydrogen polysiloxanes are the methylhydrogen polysiloxanes.

The diorganopolysiloxanes (b) are substantially linear diorganosiloxane polymers or copolymers in which the terminal silicon atoms of the polymer molecules have directly attached hydroxyl or alkoxy radicals. Suitable diorganopolysiloxanes (b) are those having an average from about 1.9 to 2 monovalent hydrocarbon radicals per silicon atom. The operable diorganosiloxane polymers are represented by the general formula

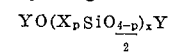

where Y is an alkyl radical, as defined above, or hydrogen atom and *x* is an integer, preferably exceeding 50 and each X is a monovalent hydrocarbon radical and *p* has an average value between about 1.9 and 2. The viscosity of the polysiloxane (b) is not critical and the polysiloxane can vary in consistency from a viscous liquid to a substantially non-flowing benzene-soluble gum. Desirably the polymer (b) should have a viscosity greater than about 100 cs. at 25° C. and for most applications, high viscosity diorganopolysiloxane liquids or diorganopolysiloxane gums are preferred. In the general formula, X can be any monovalent hydrocarbon radical for example an aliphatic hydrocarbon radical such as methyl, ethyl, propyl, hexyl, octadecyl, vinyl, allyl, hexenyl, cyclohexenyl or cyclohexyl or an aromatic hydrocarbon radical such as phenyl, tolyl, xylyl, xenyl, naphthyl, betaphenylethyl and benzyl. Preferably, at least 50 percent of the total substituents are methyl radicals, the most preferred diorganopolysiloxanes being the dimethylpolysiloxanes in which each molecule contains about at least two terminal silicon-bonded hydroxyl radicals.

The proportions of (a) and (b) in the siloxane mixture (1) can vary between wide limits. At least 0.1 percent of the alkylhydrogen polysiloxane must be present. Although the upper limit of the range is not critical, more than about 40 parts by weight of the alkylhydrogen polysiloxane in 100 parts of the mixture (1) is best avoided as this can lead in some cases to bubbling of the siloxane coating during the curing step. The preferred mixtures for use in the process of this invention are those containing from about 0.1 to 10 percent by weight of the alkylhydrogen polysiloxane and from about 99.9 to 90 percent by weight of the diorganopolysiloxane. Compositions of this type are well known for their application as paper coating materials.

Any amino-substituted silane can be employed as component (2) of the compositions employed according to this invention provided it contains at least one silicon-bonded alkoxy radical and at least one primary or secondary amino group bonded to the silicon atom through one, or more than two, carbon atoms. Suitable amino substituted silanes therefore include those of the general formula

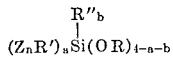

in which each R is an alkyl radical, R' is an aliphatic hydrocarbon radical containing one, or more than two carbon atoms and having a valency of $n+1$, where $n$ is a positive integer, preferably 1, 2 or 3, R'' is a monovalent hydrocarbon radical or monovalent halogenated hydrocarbon radical, $a$ is 1 or 2, $b$ is 0, 1 or 2, the sum of $a$ and $b$ is not greater than 3 and Z is the radical $-NH_2$ or a monovalent radical bonded to R' by a carbon-nitrogen linkage and is composed of carbon, nitrogen and hydrogen atoms and contains at least two amino radicals. The general formula defines both aminoalkyl-substituted silanes and polyaminoalkyl-substituted silanes depending on whether the group Z is the primary amino radical $-NH_2$ or is the defined monovalent radical containing at least two amino radicals. In the general formula, R can be any alkyl radical having less than 6 and preferably less than 4 carbon atoms, and can be for example the methyl, ethyl or isopropyl radicals. The radical R' can be any aliphatic hydrocarbon radical containing one or more than two carbon atoms and having a valency of at least 2.

Preferred as the amino-substituted silanes are those containing two or three alkoxy radicals in addition to the required aminated substituent. In view of their generally poor hydrolytic stability, the amino-silanes in which the amino group is attached to the silicon atom through a single carbon atom are preferably not employed. More preferred are those silanes in which the amino group is situated at least 3 carbon atoms distant from the silicon atom such as methyl-gamma-aminopropyltri-isopropoxy silane, vinyl-gamma-aminopropyldibutoxysilane, gamma-aminopropyltriethoxy - silane and delta - aminobutyltri-ethoxysilane.

Particularly suitable polyaminoalkyl-substituted silanes are those of the general formula $Z_nR'Si(OR)_3$ where Z, R' and $n$ are as hereinbefore defined and R is an alkyl radical containing less than 4 carbon atoms. Examples of such polyaminoalkyl-substituted silanes are N-beta-aminoethyl-gamma-aminopropyltrimethoxysilane and N-beta-aminoethyldelta-aminobutyltriethoxysilane.

Methods of preparing the aminoalkyl-substituted and polyaminoalkyl-substituted silanes are now well known in the art (see, for example, U.S. Patent No. 2,971,864, British Patent No. 872,138 and British Patent No. 889,001). One method of preparation is the reaction of allylamine with a silane containing silicon-bonded hydrogen. Alternatively, a polyamine can be reacted with a halogeno-hydrocarbon-substituted alkoxysilane to produce the aminoalkyl-substituted and polyaminoalkyl-substituted silanes.

If desired, the amino-substituted alkoxy silanes can be replaced completely in part by their water and/or benzene soluble hydrolysis products. The use of the hydrolyzate, however, appears to show no advantage over the use of the silane and involves the additional processing steps of silane hydrolysis and recovery of the hydrolyzate.

The proportion of the amino-substituted silane employed in the process of this invention is not narrowly critical. However, it is desirable that the quantity of the silane should be maintained at the lowest level consistent with obtaining the desired improvement in abrasion resistance and should preferably not exceed 20% by weight based on the weight of the polysiloxane mixture if the maximum stability of the treating composition against premature gelation is to be obtained. For most applications from 1 to about 5 percent by weight of the silane based on the weight of the polysiloxane mixture has been found to be sufficient to produce a useful improvement in the abrasion properties of the siloxane coating.

Application of the paper treating compositions according to the process of this invention is best carried out from an organic solvent solution of the polysiloxane mixture and the amino-substituted silane. The concentration of the treating solution can vary widely depending, for example, on the desired pick-up of siloxane by the paper and upon the processing conditions. Preferably, however, the treating solution will contain from 1 to about 10% by weight of siloxane.

Any of the well-known paper-coating techniques can be employed in the application of the compositions, according to the process of the invention such as, for example, roller coating, and knife coating. Following the application of the compositions, the paper can be allowed to dry by storage at room temperature. However, in practice it is generally preferred to hasten the drying and siloxane curing steps and this can be done by heating the coated paper to a temperature in the range of about 80°–150° C., and preferably to a temperature within the range of 110°–130° C.

Although siloxane curing catalysts are not in some cases essential to the success of this invention, it is preferable to hasten the siloxane curing step by including such a catalyst in the treating composition. Suitable catalysts, and the quantities in which they are best employed, are well known in the art and include the metal organic compounds such as the metal salts of carboxylic acids, for example, stannous octoate, stannous acetate, zinc octoate and compounds such as dibutyltin dilaurate, dibutyltin diacetate and cobalt naphthenate.

It is already known that aminobutanol and certain epoxy-substituted silanes can be employed as additives for improving the abrasion resistance of siloxane paper coatings. The utility of these additives has, however, been limited in that they have suffered from the disadvantage either that the improvements obtained have tended to disappear on storage of the paper or else the improvement was obtained with some types of paper only. In contrast the process of the present invention can be successfully applied to any of the common paper substrates, for example glassine, kraft, vegetable parchment, tissue and cardboard. Moreover, the improvements obtained with such papers are lasting and, at least in some instances, the abrasion resistance of the coating can actually increase during storage or ageing of the coated paper.

If desired the paper treating compositions employed in the process of this invention can incorporate known additives such as the epoxy substituted silanes or aminobutanol referred to above, although in most cases no particular advantage is thought to lie in the additional use of such additives.

The treated materials of the invention are useful in the fabrication of interleaving papers, backing papers, sacks for holding sticky materials such as bitumen and in any application in which good release properties coupled with resistance of the coating to abrasion are required.

The following examples illustrate the invention and do not limit the scope of the invention which is delineated in the claims.

Example 1

A solution was prepared comprising 92.25 g. of xylene in which was dissolved 0.17 g. of the amino-substituted silane represented by the formula

0.25 g. of dibutyltin dioctoate and 5 g. of a mixture comprising approximately 3% by weight of trimethyl silyl end-stopped methylhydrogen polysiloxane of 50 cs. viscosity at 25° C. and 97% by weight of a dimethylpolysiloxane endblocked by hydroxyl radicals (i.e.

HO[(CH$_3$)$_2$SiO]$_x$H where $x$ had an average value of about 375).

The solution was employed to coat one side of a sample of glassine paper to which it was applied by means of a wire-wound metering rod. The coated paper was then placed in an oven at 150° C. for 90 seconds to remove the solvent and cure the siloxane coating. A further sample of glassine paper was coated with the solution by passing the paper over a rotating roller which was partially immersed in the solution and which carried on its surface a film of the solution. The drying and cure time in this case was 60 seconds at 150° C.

The release properties of both samples were tested by applying an adhesive strip to the surface and measuring the force required to remove it. The results were equivalent to those obtained on glassine paper which had been treated with a similar composition except that the amino-substituted silane had been omitted.

The rub-off (or abrasion resistance) properties were tested by rubbing the treated surface with the finger. The coatings obtained by the process of this invention were found to be superior to that obtained using the solution from which the amino-silane had been omitted.

Example 2

A solution was prepared comprising 5 g. of the mixture of siloxanes and 0.5 g. of the amino-silane employed in Example 1 dissolved in 94.6 g. of xylene, the siloxane curing catalyst being omitted.

The solution was then employed to coat glassine paper by a hand coating technique using a wire-wound metering rod. The coated paper was then heated to 150° C. for 90 seconds to remove the solvent and cure the siloxane.

The coated paper was found to have release properties comparable with those obtained in a control sheet coated with a similar composition which did not contain the amino-silane and the rub-off resistance of the paper coated as above was significantly better than in the control.

Example 3

A siloxane paper coating solution was prepared by dissolving a mixture comprising approximately 3 percent by weight of a methylhydrogen polysiloxane as employed in Example 1 and approximately 97 percent of a hydroxyl terminated dimethylpolysiloxane as employed in Example 1 in xylene to give a solution containing 6 percent by weight of the siloxane mixture. To this treating solution was added 0.23 g. of dibutyltin di-2-ethylhexoate as catalyst. Two 100 g. portions of the catalyzed solution were taken and to one portion was added 0.15 g. of

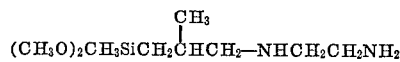

and to the other 0.15 g. of the silane

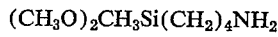

Each of the portions were applied to green vegetable parchment, containing no titanium dioxide, by means of a wire-wound metering rod and the coated paper heated immediately to 120° C. for 30 sec. to cure the siloxane. When cool the siloxane coating was found to be highly resistant to abrasion by rubbing with the finger. Paper which had been treated similarly except that the coating composition contained no amino-silane additive had a siloxane coating which could be removed on rubbing with finger.

Example 4

When the procedure of Example 3 was repeated with (CH$_3$O)$_3$Si(CH$_2$)$_3$NHCH$_2$CH$_2$NH$_2$ as the silane additive and dibutyltin diacetate as the siloxane curing catalyst a similar result was obtained.

Example 5

A catalyzed siloxane coating solution was prepared as described in Example 3 and to a 100 g. portion of the solution was added 0.50 g. of the hydrolysis product of (CH$_3$O)$_2$CH$_3$Si(CH$_2$)$_3$NH$_2$. The portion was applied to green vegetable parchment and the coating cured in the manner described in Example 3. The resulting product was a paper having an excellent release surface which was resistant to removal by abrasion.

Example 6

To each of four 100 g. portions of the catalyzed siloxane coating solution prepared in Example 3 was added 0.075 g. of the silane (CH$_3$O)$_3$Si(CH$_2$)$_3$NHCH$_2$CH$_2$NH$_2$ followed by 0.075 g. of one of

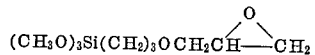

tetraethyl orthosilicate, methyl Cellosolve orthosilicate or 2-aminobutanol. Each of the portions was then employed to coat samples of titanium-dioxide-free green vegetable parchment in the manner described in Example 3. The cured siloxane coating was found in each case to be resistant to rub-off.

The procedure was repeated with a siloxane coating solution containing 0.30 g. of

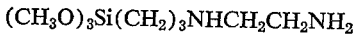

and 0.30 g. of tetraethyl orthosilicate and a similar result obtained.

Example 7

When the procedure described in Example 3 was repeated employing a siloxane coating solution containing 0.05 g. of (CH$_3$O)$_3$Si(CH$_2$)$_3$NHCH$_2$CH$_2$NH$_2$ similar results were obtained.

Example 8

A siloxane mixture was prepared comprising 0.18 g. of a methylhydrogen polysiloxane of 50 cs. viscosity at 25° C. and 5.82 g. of a hydroxy terminated dimethylpolysiloxane having a viscosity of approximately 3000 cs. at 25° C. This mixture of siloxanes was then dissolved in 94 g. of xylene and to the solution was then added a mixture of 0.3 g. of the silane

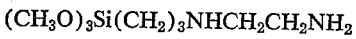

and 0.15 g. of dibutyltin diacetate. The solution as prepared was employed to coat green vegetable parchment according to the procedure described in Example 3.

The cured siloxane coating had good release properties and was resistant to removal by abrasion.

Example 9

A siloxane mixture comprising 1.0 g. of 50 cs. methylhydrogen polysiloxane and 5.0 g. of a dimethylpolysiloxane gum was dissolved in 94.0 g. of xylene. To the solution thus obtained was added 0.3 g. of the silane

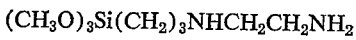

and 0.45 g. of dibutyltin di-2-ethylhexoate.

This solution was then applied to green vegetable parchment in the manner described in Example 3. The cured siloxane coating was found to have good release properties and was resistant to removal by abrasion.

Example 10

When the following siloxanes are substituted for the siloxanes of Example 3, equivalent results are obtained:
(A) 0.1 weight percent of a methylhydrogen siloxane copolymer consisting of 80 mol percent (CH$_3$)HSiO units and 20 mol percent (CH$_3$)$_2$SiO units and endblocked with (C$_6$H$_{13}$)(CH$_3$)HSiO$_{0.5}$ units, and 99.9 weight percent of an ethoxy endblocked dimethylpolysiloxane having a viscosity of 3500 cs. at 25° C.

(B) 40 weight percent of an ethyl hydrogen polysiloxane, and 60 weight percent of a diorganosiloxane copolymer consisting of 65 mol percent dimethylsiloxane units and 30 mol percent phenylmethylsiloxane units and 5 mol percent vinylmethylsiloxane units having a viscosity of 34,000 cs. at 25° C.

(C) 10 weight percent of an alkylhydrogensiloxane copolymer consisting of 55 mol percent (CH$_3$)HSiO units, 36 mol percent (CH$_3$CH$_2$CH$_2$)HSiO units, 5 mol percent [CH$_3$(CH$_2$)$_4$]HSiO units and 4 mol percent octadecylhydrogensiloxane units, and 90 weight percent of a diorganosiloxane copolymer gum consisting of 85 mol percent dimethylsiloxane units, 10 mol percent of methylalkylsiloxane units and 5 mol percent of xenylmethylsiloxane units.

(D) 5 weight percent of a methylhydrogensiloxane polymer, 95 weight percent of a diorganosiloxane copolymer composed of 50 mol percent dimethylsiloxane units and 50 mol percent ethylmethylsiloxane units and having a viscosity of 10,000 cs. at 25° C.

Example 11

When

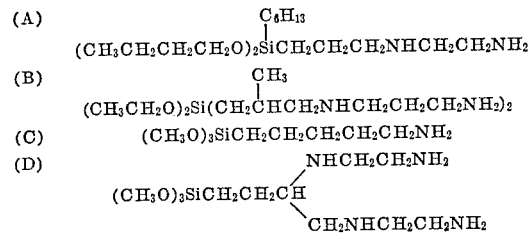

is substituted for (CH$_3$O)$_3$SiCH$_2$CH$_2$NHCH$_2$CH$_2$NH$_2$ in Example 1, equivalent results are obtained.

Example 12

When the following amino-substituted silicon compounds are substituted for the amino-substituted silanes of Example 3, equivalent results are obtained:

(A) 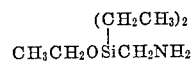
   (CH$_3$CH$_2$CH$_2$CH$_2$O)$_2$SiCH$_2$CH$_2$CH$_2$NHCH$_2$CH$_2$NH$_2$ (B)              CH$_3$
   (CH$_3$CH$_2$O)$_2$Si(CH$_2$CHCH$_2$NHCH$_2$CH$_2$NH$_2$)$_2$ (C)    (CH$_3$O)$_3$SiCH$_2$CH$_2$CH$_2$CH$_2$CH$_2$NH$_2$ (D) 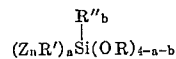

That which is claimed is:

1. A process for the treatment of paper which comprises applying thereto a composition consisting essentially of an organic solvent solution of (1) a mixture of (a) from 0.1 to 40% by weight of an alkylhydrogenpolysiloxane with (b) 99.9 to 60% by weight of a diorganopolysiloxane containing terminal, silicon-bonded hydroxyl or alkoxy radicals, and (2) from 1 to 20% by weight based on the weight of (1) of (c) an amino substituted silane containing at least one silicon bonded alkoxy radical and at least one amino group bonded to the silicon through one or more than two carbon atoms, or (d) a benzene soluble hydrolyzate of said silane, and thereafter curing the applied siloxane.

2. A process in accordance with claim 1 wherein the organic solvent is xylene.

3. A process in accordance with claim 1 wherein the amino-substituted silane has the general formula $$(Z_nR')_a\overset{R''_b}{\underset{|}{Si}}(OR)_{4-a-b}$$

in which each R is an alkyl radical, R' is an aliphatic hydrocarbon radical containing one or more than two carbon atoms and having a valency of $n+1$ where $n$ is a positive integer, R'' is a monovalent radical selected from the group consisting of hydrocarbon radicals and halogenated hydrocarbon radicals, $a$ is 1 or 2, $b$ is 0, 1 or 2, the sum of $a$ and $b$ is not greater than 3 and Z is a monovalent radical selected from the group consisting of —NH$_2$ and radicals bonded to R' through a carbon-nitrogen linkage composed of carbon, nitrogen and hydrogen atoms and containing at least two amino groups.

4. A process in accordance with claim 3 wherein the amino-substituted silane is a polyaminoalkyl-substituted silane of the general formula Z$_n$R'Si(OR)$_3$ in which each R is an alkyl radical containing less than 4 carbon atoms, R' is an aliphatic hydrocarbon radical containing one or more than two carbon atoms and having a valency of $n+1$ where $n$ is a positive integer, and each Z is a monovalent radical bonded to R' by a carbon nitrogen linkage and is composed of carbon, nitrogen and hydrogen atoms and contains at least two amino groups.

5. A process as claimed in claim 4 wherein the polyaminoalkyl-substituted compound is N-beta-aminoethyl-gamma-aminopropyl trimethoxy silane.

6. A process as claimed in claim 3 wherein in the general formula R is an alkyl radical of less than 4 carbon atoms, Z is the —NH$_2$ radical, R' a divalent aliphatic hydrocarbon radical connecting the —Z group to the silicon by a chain of at least 3 carbon atoms, $a$ is 1 and $b$ is zero.

7. A process as claimed in claim 6 wherein the amino-substituted silane is aminopropyl triethoxy silane.

8. A process in accordance with claim 3 wherein the amino-substituted silane (2) is employed in a quantity comprising from 1 to 5 percent by weight based on the weight of the organopolysiloxane mixture (1).

9. A process for the treatment of paper and paper products as claimed in claim 1 wherein the composition also contains a siloxane curing catalyst.

10. A process as claimed in claim 9 wherein the siloxane curing catalyst is a metal salt of a carboxylic acid.

11. A process as claimed in claim 10 wherein the siloxane curing catalyst is dibutyltin dioctoate, dibutyltin diacetate or stannous octoate.

12. A process as claimed in claim 1 wherein the mixture (1) comprises from 0.1 to 10 percent by weight of the alkylhydrogen polysiloxane (a) and from 99.9 to 90 percent by weight of the diorganopolysiloxane (b).

13. A process as claimed in claim 1 wherein the alkylhydrogen polysiloxane is a methylhydrogenpolysiloxane.

14. A process as claimed in claim 1 wherein the diorganopolysiloxane is a dimethylpolysiloxane containing terminal silicon-bonded hydroxyl radicals.

15. A process as claimed in claim 1 wherein the applied siloxanes are cured by heating to a temperature in the range from 80 to 150° C.

16. A process for the treatment of paper as claimed in claim 3 wherein the composition also contains a siloxane curing catalyst.

17. A process as claimed in claim 16 wherein the siloxane curing catalyst is a metal salt of a carboxylic acid.

18. A process as claimed in claim 17 wherein the siloxane curing catalyst is dibutyltin dioctoate, dibutyltin diacetate or stannous octoate.

19. A process as claimed in claim 3 wherein the mixture (1) comprises from 0.1 to 10 percent by weight of the alkylhydrogen polysiloxane (a) and from 99.9 to 90 percent by weight of the diorganopolysiloxane (b).

20. A process as claimed in claim 3 wherein the alkylhydrogen polysiloxane is a methylhydrogenpolysiloxane.

21. A process as claimed in claim 3 wherein the diorganopolysiloxane is a dimethylpolysiloxane containing terminal silicon-bonded hydroxyl radicals.

22. A process as claimed in claim 3 wherein the applied siloxanes are cured by heating to a temperature in the range from 80 to 150° C.

23. A process for the treatment of paper as claimed in claim 4 wherein the composition also contains a siloxane curing catalyst.

24. A process as claimed in claim 23 wherein the siloxane curing catalyst is a metal salt of a carboxylic acid.

25. A process as claimed in claim 24 wherein the siloxane curing catalyst is dibutyltin dioctoate, dibutyltin diacetate or stannous octoate.

26. A process as claimed in claim 4 wherein the mixture (1) comprises from 0.1 to 10 percent by weight of the alkylhydrogen polysiloxane (a) and from 99.9 to 90 percent by weight of the diorganopolysiloxane (b).

27. A process as claimed in claim 4 wherein the alkylhydrogen polysiloxane is a methylhydrogenpolysiloxane.

28. A process as claimed in claim 4 wherein the diorganopolysiloxane is a dimethyl polysiloxane containing terminal silicon-bonded hydroxyl radicals.

29. A process as claimed in claim 4 wherein the applied siloxanes are cured by heating to a temperature in the range from 80 to 150° C.

References Cited

UNITED STATES PATENTS

| | | |
|---|---|---|
| 2,588,365 | 3/1952 | Pennett. |
| 2,588,393 | 3/1952 | Kauppi. |
| 2,971,864 | 2/1961 | Speier. |
| 2,985,545 | 5/1961 | Leavitt. |
| 3,247,281 | 4/1966 | Gagliardi _____ 117—155 X |
| 3,303,048 | 2/1967 | Cooper et al. _____ 117—155 X |

FOREIGN PATENTS

| | | |
|---|---|---|
| 872,138 | 7/1961 | Great Britain. |
| 889,001 | 2/1962 | Great Britain. |

WILLIAM D. MARTIN, *Primary Examiner.*

M. LUSIGNAN, *Assistant Examiner.*

U.S. Cl. X.R.

117—161; 260—825